United States Patent [19]

Mertzweiller et al.

[11] 4,252,679

[45] Feb. 24, 1981

[54] PREPARATION OF MAGNETIC CATALYSTS (MSB-06)

[75] Inventors: Joseph K. Mertzweiller, Baton Rouge; Lloyd A. Pine, Greenwell Springs; Robert L. Seiver, Baton Rouge, all of La.

[73] Assignee: Exxon Research & Engineering Co., Florham Park, N.J.

[21] Appl. No.: 95,170

[22] Filed: Nov. 19, 1979

[51] Int. Cl.³ ............... B01J 27/14; B22F 3/00; C23C 1/10; C22B 1/16
[52] U.S. Cl. .................... 252/435; 252/437; 252/62.55; 148/6.15 R; 75/0.5 AA
[58] Field of Search ............ 252/435, 437, 62.55; 148/6.15 R; 75/0.5 AA

[56] References Cited

U.S. PATENT DOCUMENTS

| | | | |
|---|---|---|---|
| 1,789,477 | 1/1931 | Roseby | 252/62.55 |
| 2,783,208 | 2/1957 | Katz | 252/62.55 |
| 2,791,561 | 5/1957 | Beller et al. | 252/62.55 X |

Primary Examiner—Delbert E. Gantz
Assistant Examiner—William G. Wright
Attorney, Agent, or Firm—Llewellyn A. Proctor

[57] ABSTRACT

A novel catalyst composition, and process for the preparation of magnetic, catalytic composites to improve catalytic metals utilization. A particulate magnetic alloy of iron or cobalt is contacted with a phosphate ion containing solution and reacted therewith sufficiently to form a surface film thereupon, removed from said solution, preferably dried, then admixed or otherwise incorporated within an inorganic oxide matrix, notably alumina, as inclusions, the composite particle is then contacted with a solution which contains a compound, or compounds, of a Group VIII noble metal, notably platinum, which is deposited within the composite particle in catalytically effective amounts without significant loss of the catalytic metal due to surface deposition of the catalytic metal upon said particulate magnetic alloy inclusions.

26 Claims, No Drawings

PREPARATION OF MAGNETIC CATALYSTS (MSB-06)

BACKGROUND OF THE INVENTION AND PRIOR ART

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably platinum, have been widely used commercially in recent years in the production of reforming catalysts, and platinum or alumina catalysts have been commercially employed in refineries for the last few decades. In the last decade, additional metallic components have been added to platinum as promoters to further improve the activity or selectivity, or both, of the basic platinum catalyst, e.g., iridium, rhenium, tin, and the like. Reforming is defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

In reforming, a series of reactors constitute the heart of the reforming unit. Each reactor is generally provided with fixed beds of catalyst which receive upflow or downflow feed, and each is provided with a preheater or interstage heater, because the reactions which take place are endothermic. A naphtha feed, with hydrogen, or recycle gas, is cocurrently passed through a preheat furnace and reactor, and then in sequence through subsequent heaters and reactors of the series. The product from the last reactor is separated into a liquid fraction, i.e., a $C_5{}^+$ or $C_5/430°$ fraction, and a vaporous effluent. Hydrogen or gas rich in hydrogen which usually contains small amounts of normally gaseous hydrocarbons, is separated from the latter, and recycled to the first reactor of the unit to minimize coke production. During operation, process temperature is gradually raised to compensate for the catalyst activity loss caused by the coke deposition. Eventually, however, economics dictates the necessity of reactivating the catalyst. Consequently, in all processes of this type the catalyst must necessarily be periodically regenerated, and this is usually done by burning the coke off the catalyst at controlled conditions; and thereafter, reactivation of the catalyst is completed in a sequence of steps wherein the agglomerated metal hydrogenation-dehydrogenation components are atomically redispersed.

In recent months considerable thought has been given to improving reforming processes, particularly by providing short cycle processes which, inter alia, utilize beds of fluidizable magnetizable catalytic particles which are contacted, and fluidized, with a naphtha feed and hydrogen at reforming conditions to produce a naphtha product of improved octane while simultaneously the fluidized beds are subjected to an axially applied magnetic field. In such processes the activity and selectivity of the catalyst throughout the operation approximates that of fresh, or freshly-reactivated catalyst, and preferably the operation is conducted at high severity conditions, as contrasted with present commercially produced reforming operations. In the improved processes, and as described by Application Ser. Nos. 054,032 and 054,033 filed July 2, 1979, continuous operation of all portions of the reforming unit is conducted, and the catalyst is moved therethrough as a more cohesive phase, or phase of narrow age distribution. Such processes are admirably suitable for conducting operations with a wide variety of feeds, particularly at high temperatures and low pressures, or other high severity conditions.

The application of a magnetic field upon a bed of fluidized, magnetizable catalytic particles in its preferred aspects stabilizes the bed and thereby suppresses, or minimizes bubble formation. The characteristics attributed to the stabilized bed greatly improve gas-solids contacting and lessen the need for long residence times; and yet the state of the bed is such that it can be rapidly recycled between reactor and regenerator. The properties of the bed in a magnetically stabilized state approach those of plug flow, thus providing the higher gas-solids contacting efficiencies offered by fixed bed contacting. Yet the magnetically stabilized bed, since it is fluidized, offers the advantages of fluidized beds for purposes of transport. Shorter contact times become feasible, and desirable because of higher average catalyst activity level. Moreover, the small particles which in a fixed bed would have a prohibitively high pressure drop at reasonable gas velocities provide very large surface areas which enhance catalysis and gas-solids contacting.

The catalyst employed in a magnetically stabilized bed operation is necessarily constituted of composite particles, preferably small particles, suitably particles which range in average diameter below about 800 microns, more preferably those which range from about 100 to 300 microns. The particles contain, besides a carrier or support material, a sufficient amount of a ferromagnetic or ferrimagnetic material to make the particles magnetizable, and a hydrogenation-dehydrogenation component, or components. A reforming catalyst also contains a halide component and, preferably, the catalyst is sulfided. Preferred magnetizable materials include ferromagnetic and ferrimagnetic alloys of metals, and metallic metals such as iron, nickel, cobalt. In general, also, the non-magnetizable material will include a vast number of conventional materials which are inert and/or known to catalyze the desired reaction.

The magnetizable component can be directly incorporated with the non-magnetizable material. For example, the non-magnetizable materials may be impregnated with a soluble precursor of a ferromagnetic or ferrimagnetic substance, e.g., an oxide, which is subsequently reduced to render the particles ferromagnetic or ferrimagnetic. Alternatively, the ferromagnetic or ferrimagnetic material may be incorporated into the non-magnetizable component by encapsulation of finely divided ferromagnetic or ferrimagnetic material. Thereafter, the catalytic component, e.g., the Group VIII noble metal, or metals, (Periodic Table of the Elements; Sargent Welch Scientific Company, Copyright 1968) notably platinum and metals used as promoters, if any, are composited with a previously pilled, pelleted, beaded, or extruded particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components. Unfortunately, however, it is found that during impregnation of the catalytic metals onto the carriers, or supports, significant portions thereof are often lost or rendered catalytically inactive, or ineffective, apparently because the metals plate out on the ferromagnetic alloys or metals.

Only iron and cobalt, or alloys of such metals have sufficiently high Curie temperatures to remain magnetic in high temperature operations, notably at the high process temperatures used in refining operations. Unfortunately too, only a few alloys of these metals are sufficiently passive that they can withstand attack by the liquids and gases of process streams; such attack often causing the metal alloys to become rapidly oxidized, this resulting in the loss of their magnetic character. Of the handfull of metal alloys which are suitable for this purpose, e.g., stainless steel alloys, an unacceptable amount of the catalytic metal, e.g., Group VIII noble metal, notably platinum, is deposited on the alloy particles, the deposited catalytic metal being rendered ineffective in the performance of its catalytic function and thereby wasted. Such waste is obviously burdensome, and often intolerable.

It is accordingly a primary objective of the present invention to provide a novel composition, and process for the preparation of magnetic, catalytic composites to improve catalytic metals utilization.

A particular object is to provide a process of such character wherein magnetic ferrous metal alloy components of said magnetic, catalytic composites are passivated to suppress loss of the catalytic effectiveness of Group VIII noble metals, notably platinum, composited therewith.

A more particular object is to provide a novel process for the passivation of magnetic stainless steel to improve the catalytic effectiveness of catalytic metal components, especially Group VIII noble metals, notably platinum, composited therewith.

These objects and others are achieved in accordance with the practice of the present invention which embodies a composition, and process wherein a particulate magnetic alloy of iron or cobalt is contacted with a phosphate ion containing solution and reacted therewith sufficiently to form a surface film thereupon, removed from said solution, preferably dried, then admixed or otherwise incorporated within an inorganic oxide matrix, notably alumina, as inclusions, the composite particle is then contacted with a solution which contains a compound, or compounds, of a Group VIII noble metal, notably platinum, which is deposited within the composite particle in catalytically effective amounts without significant loss of the catalytic metal due to surface deposition of the catalytic metal upon said particulate magnetic alloy inclusions.

In its preferred aspects, a particulate magnetic iron alloy, notably a magnetic stainless steel alloy, is contacted with a phosphate ion containing solution and reacted therewith sufficiently to form a surface film, or coating thereupon, the particulate magnetic stainless steel alloy is removed from said solution, and dried. The powdered alloy is then admixed or otherwise incorporated within the inorganic oxide, or alumina as inclusions, and the composite particle is then contacted with a solution of said Group VIII noble metal compound, or compounds, particularly platinum, which is deposited in catalytically effective amounts within the composite particle without significant loss of the catalytic metal due to surface deposition of the catalytic metal upon said particulate magnetic stainless steel inclusions.

The magnetic alloys are formed into particles of average diameter ranging from about 5 to about 150 microns, preferably from about 10 to about 44 microns, and the particles then contacted, sprayed, or immersed in a dilute solution containing the phosphate ion for a time sufficient to permit the formation of a protective film, or coating thereupon. The particulate magnetic alloy is preferably immersed in the solution, suitably an aqueous solution, a contact time ranging from about 10 minutes to about 30 minutes, preferably from about 10 minutes to about 20 minutes, being sufficient at ambient conditions to form a continuous film. The nature of the film is not known, but a slight, visible change in coloration at the surface of the particles occurs on immersion of the particles within the solution. After the period of contact, or immersion, the magnetic particles are withdrawn from the solution and dried, e.g., by exposure to air, or by removal of the residual solution with an organic solvent such as alchol, alcohol and ether, acetone or the like; this step generally followed by air evaporation.

The dried, particulate now passivated magnetic alloys can be admixed or otherwise incorporated with an inorganic oxide material, notably alumina, in various ways known to the art. The powdered magnetic alloys are dispersed as inclusions, suitably spaced apart one from another and present in dilute concentration within the inorganic oxide material which serves as a matrix. Such composite generally contains from about 0.5 to about 50 percent, preferably from about 5 to about 40 percent of the alloy particles, based on the volume of the total composite particle.

The composite can be suitably formed by cogellation of the magnetic alloy particles with an inorganic oxide support material, preferably by admixture in a slurry or solution with an inorganic oxide precursor which is precipitated from solution with the magnetic alloy particles, the latter becoming inclusions within an inorganic oxide matrix. The composite can then be dried, calcined and impregnated to incorporate the desired catalytic metal, or metals; or a catalytic metal component, or components, can be incorporated within the composite particles at the time of formation by addition to the slurry or solution of a soluble compound, or compounds, of the catalytic metal, or metals. The support per se, aside from the magnetic alloy inclusions, can be constituted of, or contain, for example, one or more of alumina, bentonite, clay, diatomaceous earth, zeolite, silica, magnesia, zirconia, thoria, and the like. The most preferred support is alumina to which, if desired, can be added a suitable amount of other refractory carrier materials such as silica, zirconia, magnesia, titania, etc., usually in a range of about 1 to 20 percent, based on the weight of the support. Exemplary of a support for the practice of the present invention is one having a surface area of more than 50 m$^2$/g, preferably from about 100 to about 300 m²/g, and higher, a bulk density of about 0.3 to 1.0 g/ml, and higher, an average pore volume of about 0.2 to 1.1 ml/g, and an average pore diameter ranging about 30 A to about 300 A, and higher.

The composite particle is calcined and then, preferably, impregnated with a catalytic metal, or metals. Suitably, the composite particle is calcined at relatively low temperature, preferably at temperatures ranging from about 300° F. to about 800° F., more preferably from about 300° F. to about 500° F. It has thus been found that low calcination temperatures are preferable inasmuch as composite particles calcined at low temperatures prior to impregnation produce catalysts which possess greater activity, and provide higher $C_5^+$ liquid yields. Moreover, low temperature calcination of the composite particles provides more effective passivation of the magnetic particles on contact with the phosphate ion.

Short contact times are also advantageous during the impregnation. Thus, it has been found that contact times extending beyond about thirty minutes permits greater deposition of precious metals upon the phosphate ion treated magnetic alloy inclusions of the composite, and hence there is little, if anything, to be gained by extensive periods of impregnation. Suitably, the period of impregnation ranges from about 5 minutes to about 30 minutes, preferably from about 10 minutes to about 20 minutes.

Essentially any catalyst component, or components, can be composited with the support particles, or with said inclusions, dependent upon the type of reaction which is to be carried out. For example, in conducting hydrocarbon conversion reactions, e.g., a hydroforming (reforming, with hydrogen) reaction, a catalyst can be formed which comprises a composite of a refractory or inorganic oxide support material, particularly alumina, and a Group VIII noble metal hydrogenation-dehydrogenation component, e.g., ruthenium, rhodium, palladium, osmium, iridium or platinum, notably platinum, to which a promoter metal, e.g., rhenium, iridium or the like may be added to promote the activity and selectivity of the catalysts. Suitably, the reforming catalyst, or composite also contains an added halogen component to provide acidity, particularly fluorine or chlorine, and preferably the promoter component is introduced into the support, or catalyst, by impregnating same with a solution comprising a soluble salt or compound thereof. The catalyst can also be sulfided, as in the conventional manner.

The catalyst composites of this invention may be in the form of powder, beads, tablets, pills, pellets, or extrudates depending upon the type of process.

The invention will be more fully understood by reference to the following selected demonstrations and examples which present comparative data which illustrates its more salient features. All parts are given in terms of weight except as otherwise specified.

The example immediately following describes the preparation and testing of two reforming catalysts under conditions which simulate the short contact times employed in a magnetically stabilized fluidized bed.

EXAMPLE 1

Catalyst A, a conventional, or non-magnetic catalyst, was prepared by spray drying a reforming grade alumina followed by drying, and calcining at 1000° F. The calcined alumina powder was impregnated with a solution of chloroplatinic acid and hydrochloric acid sufficient to yield a catalyst containing nominally 0.3 wt. % platinum and 0.8 wt. % chloride. Following the impregnation, the catalyst was dried and then activated by heating to 900° F. in air followed by reduction in $H_2$ at 900° F. The activated catalyst was then tested in a small fixed bed pilot plane.

Feed to the pilot plant was a hydrofined virgin naphtha boiling from 180° to 360° F. spiked with a sulfur compound in amount sufficient to provide 10 ppm feed sulfur. The nominal charge of catalyst to the pilot plant is 5 to 10 grams, and hence only small quantities of products are obtained. The aromatics content of the product was measured, since it is not possible to obtain an octane measurement with a knock engine, and product octane was estimated from a correlation based on reforming this same feed in a larger pilot plant; this value being given in terms of a catalyst performance number. The catalyst performance number (CPN) is an index that includes activity, octane producibility and process conditions.

Following a 1.5 hour line out period, four balance periods were taken at 1.5 hour intervals and the data plotted to determine catalyst performance at the sixth hour on oil for comparison purposes.

Catalyst B was made and tested in the same manner as Catalyst A except that enough 10-44 micron 410 stainless steel particles were added to the spray drier feed to produce a product containing 41 wt. % steel. The results of these two tests are given in the Table I below. In the data given on the magnetic catalyst, the data are corrected so that the ferromagnetic compound is considered to be inert and hence it makes no contribution to the process reactions.

TABLE I

| Catalyst | 950° F., 100 psig, 4800 SCF/B | | |
|---|---|---|---|
| | CPN | $C_5$+Yield, LV % | Pt on $Al_2O_3$, Wt. % |
| A | 135 | 80.1 | 0.32 |
| B | 16 | 75.2 | 0.23 |

These data show that Catalyst B, inter alia, has a lower amount of platinum on the alumina catalyst support than Catalyst A, as a result of which its activity has been diminished; and it has produced a considerably lower liquid yield than Catalyst A. Electron probe measurements verified that the surface of the 410 stainless steel particles was rich in platinum presumably due to a galvanic plating reaction. Platinum on the stainless steel, as known, is practically inert as a catalyst. It is apparent from these data that a method is needed to supress this loss of catalytically active platinum.

The example immediately following describes a variety of passivation treatments, and these are compared with an untreated test specimen to demonstrate suppression of the galvanic plating reaction. If the deposition of platinum is a true plating reaction, as is believed, it should thus involve the oxidation of zero valent iron and chromium in the steel by the platinum ion. It would thus be expected, that treatments to increase the thickness and density of the protective chromium oxide coating found on 400 series stainless steel would provide increased protection.

EXAMPLE 2

The screening technique used in this example involved pretreating a series of 410 stainless steel test coupons in a variety of ways expected to increase the oxide coating. In such testing, the treated coupons were placed in the same $H_2PtCl_6$—HCl solution used for impregnating the reforming catalysts. As platinum plated out on the coupons, the surface of the coupons became darker so that it was possible to visually compare the rate of plating and the effect of different pretreatments on this rate against the control specimen. The results of these screening tests are summarized in Table II below:

TABLE II

| Pretreatment | Plating Reaction Rate Relative to Control |
| --- | --- |
| 1. Heated to dull red in oxidizing flame of burner | Faster |
| 2. Heated as in 1 above then quenched in water. | Faster |
| 3. Boiled 60 mins. in 9 wt. % NaOH solution | Faster |
| 4. Boiled 60 mins. in 20 wt. % NaOH solution | Faster |
| 5. Soaked 40 mins. in 5.1 wt. % $H_3PO_4$ at room temperature | Faster |
| 6. Boiled 60 mins. in 5.1 wt. % $H_3PO_4$ solution | Faster |
| 7. No treatment for control | Same |
| 8. Soaked 15 mins. in 8.3 wt. % nitric acid at room temperature | Slower |
| 9. Soaked 15 mins. in 10.4 wt. % sulfuric acid at room temperature. | Slower |
| 10. Soaked 15 minutes in 5.1 wt. % phosphoric acid at room temperature | Slower |

Of all the treatments tried, soaking the test coupon for a short time in dilute phosphoric acid had by far the greatest effect in supressing the undesirable plating reaction.

In Example 3, below, the coupon screening test was again used to better define the optimum time of treatment.

EXAMPLE 3

As in Example 2 above, the test coupons were cleaned and then treated in 5.1 wt. % $H_3PO_4$ for several different times. The coupons were then water rinsed and tested in the $H_2PtCl_6$—HCl solution. The results are summarized in Table III below. The differences in the plating reaction rates for the coupons treated 10 and 15 minutes were too small to visually test with a high degree of accuracy.

Table III

| 5.1 Wt. % $H_3PO_4$- Room Temperature | |
| --- | --- |
| Treatment Time, Minutes | Plating Reaction Rate Relative to Control |
| 5 | Faster |
| Control (No Treatment) | Same |
| 10 | Slowest |
| 15 | Slowest |
| 30 | Slower |

EXAMPLE 4

This example compares the effectiveness of the phosphoric acid treatment on two different stainless steels, i.e., 410 and 446 stainless steels. (Stainless steel 446 has a higher chromium content than 410.) The example also simulates the effect of the calcining step used prior to impregnating the platinum on a ferromagnetic reforming catalyst. Protection time is defined as the time required before the platinum metal plated out on the coupon to the extent that some of the platinum black started to flake from the surface of the coupon. With reference to the data presented in Table IV, some darkening of the stainless steel test coupons occurred before flaking, but the flaking made a more reproducible end point for quantifying the screening test.

TABLE IV

| Treatment for 15 Minutes in 5.1 Wt. % $H_3PO_4$ At Room Temperature | | | |
| --- | --- | --- | --- |
| Steel | $H_3PO_4$ | Calcining Temperature, °F.[1] | Protection Time, Min. |
| 410 | No (Control) | None | 2 |
|  | Yes | None | 12 |
|  | Yes | 400 | 24 |
|  | Yes | 500 | 16 |
|  | Yes | 600 | 9 |
|  | Yes | 700 | 7 |
|  | Yes | 800 | 2 |
| 446 | No (Control) | None | 35 |
|  | Yes | None | >150 |
|  | Yes | 800 | 11 |

[1] 3 hour calcination time.

The results show that the higher chrome 446 stainless steel is more resistant to the plating reaction than 410 stainless but that its resistance is further enhanced by the dilute $H_3PO_4$ treatment. The data also show that low temperature calcination prior to the impregnation step aids $H_3PO_4$ passivation, whereas in contrast calcining at 1000° F., as commonly practiced, renders the $H_3PO_4$ treatment less effective. Clearly, the data show that low temperature calcination, or calcining at 400° F., actually lengthens the protection time.

EXAMPLE 5

This example describes the preparation of two additional magnetic powerforming catalysts utilizing the results from the coupon screening test as a guide to preparing an optimum effective catalyst. Catalysts C and D were thus prepared and tested in the same manner as Catalyst B of Example 1 except that the 410 stainless steel powder was soaked for 15 minutes at room temperature in 5.1 wt. % phosphoric acid before being added to the spray drier feed. The method of treating Catalysts C and D differ only in the calcining temperature used prior to being impregnated with the chloroplatinic acid-hydrochloric acid solution. The results are given in Table V.

TABLE V

| Catalyst | B | C | D |
| --- | --- | --- | --- |
| Stainless steel treatment | None | $H_3PO_4$ | $H_3PO_4$ |
| Calcining prior to Pt impregnation | 3 Hrs @ 1000° F. | 3 Hrs@ 1000° F. | 3 Hrs @ 400° F. |
| CPN | 16 | 27 | 121 |
| $C_5^+$ Yield, LV % | 75.2 | 77.8 | 79.9 |
| Pt on $Al_2O_3$, Wt. % | 0.23 | 0.32 | 0.29 |

These data thus show that Catalyst D, the preferred catalyst of this invention is obviously the superior magnetic catalyst and in fact compares quite favorably with the non-magnetic control Catalyst A. It is particularly interesting to note that Catalyst C has a lower than expected activity considering that very little loss of platinum to the stainless steel was observed. This indicates that there is a benefit from the lower calcination temperature per se, in addition to that of helping to suppress the platinum plating reaction.

EXAMPLE 6

In additional runs, such as described, a series of catalysts were formed from phosphoric acid passivated, 410 stainless steel inclusions and alumina. These composites were then calcined over different time periods at different temperatures, and then impregnated with chloroplatinic acid. The data given in Table VI shows the average yield and catalyst activity performance for each run.

TABLE VI $H_3PO_4$ Passivated Pt-magnetic Catalyst Results

| Preimpregnation Calcination | | Impregnation | | C5+, LV % @ |
| --- | --- | --- | --- | --- |
| Time, Hrs. | Temp., °F. | Time, Min. | CPN | 100 RON[1] |
| 3.5 | 400 | 5 | 120 | 80.0 |
| 3 | 400 | 5 | 117 | 79.8 |
| 3 | 500 | 5 | 119 | 80.0 |
| 16 | 400 | 5 | 111 | 77.6 |
| 16 | 500 | 5 | 109 | 78.8 |
| 16 | 500 | 5 | 115 | 78.9 |
| 1 | 1000 | 10 | 31 | 78.8 |

[1]Results at the end of the 6th hour.

Quite clearly, the catalysts formed at calcination temperatures of 400° F. and 500° F. show better activity, and yield than that calcined at 1000° F.; which is a more conventional calcination temperature. It would also appear that long calcination periods, even at the low temperatures, should be avoided.

Various compounds, notably salts, can be employed to supply the phosphate ion to the solution, which preferably is an aqueous medium, e.g., ammoniumdihydrogen phosphate, ammonium hydrogen phosphate, sodium phosphate, potassium phosphate, and the like. It is, of course, apparent that various modifications or changes can be made, as in the temperature, solution concentration, and the like, without departing from the spirit and scope of the invention.

Having described the invention, what is claimed is:

1. In a process for improving the utilization of catalytic metals which are incorporated within a magnetic, catalytic composite constituted of a particulate magnetic alloy of iron or cobalt dispersed as inclusions in an inorganic oxide matrix,
   the improvement comprising
   contacting said particulate magnetic alloy of iron or cobalt prior to its incorporation within said composite with a phosphate ion containing solution sufficient to form a surface film thereupon,
   then incorporating said particulate magnetic alloy of iron or cobalt with said inorganic oxide to form said composite, and contacting said composite with a solution containing a compound of the catalytic metal to deposit same on said composite in catalytically effective amounts.

2. The process of claim 1 wherein the inorganic oxide matrix is alumina.

3. The process of claim 1 wherein the phosphate ion containing solution is phosphoric acid.

4. The process of claim 1 wherein the inorganic oxide matrix is alumina and the phosphate ion containing solution is phosphoric acid.

5. The process of claim 1 wherein the catalytic metal is a Group VIII metal.

6. The process of claim 1 wherein the catalytic metal is a Group VIII noble metal.

7. The process of claim 1 wherein the inorganic oxide matrix is alumina, the phosphate ion containing solution is phosphoric acid, and the catalytic metal is a Group VIII metal.

8. The process of claim 1 wherein the particulate, magnetic metal alloy incorporated as inclusions within the inorganic oxide matrix is stainless steel.

9. The process of claim 1 wherein the particulate magnetic alloy of iron or cobalt is contacted with the phosphate ion containing solution for a period ranging from about 10 minutes to about 30 minutes.

10. The process of claim 1 wherein the inorganic oxide matrix is alumina, the phosphate ion containing solution is phosphoric acid, the catalytic metal is a Group VIII metal and the particulate, magnetic metal alloy incorporated as inclusions within the alumina matrix is stainless steel.

11. The process of claim 1 wherein the inorganic oxide matrix is alumina, the phosphate ion containing solution is phosphoric acid, the catalytic metal is a Group VIII noble metal, the particulate, magnetic metal alloy incorporated into the alumina matrix is stainless steel particles of average diameter ranging from about 5 microns to about 150 microns, and the time of contact with the phosphoric acid solution ranges from about 10 minutes to about 30 minutes.

12. The process of claim 6 wherein the catalytic metal is platinum.

13. The process of claim 7 wherein the catalytic metal is a Group VIII noble metal.

14. The process of claim 13 wherein the Group VIII noble metal is platinum.

15. The process of claim 8 wherein the particulate, magnetic metal alloy incorporated as inclusions within the inorganic oxide matrix is stainless steel, and the particles range from about 5 microns to about 150 microns in average diameter.

16. The process of claim 15 wherein the particles range from about 10 microns to about 44 microns in average diameter.

17. The process of claim 9 wherein the contact ranges from about 10 minutes to about 20 minutes.

18. The process of claim 10 wherein the catalytic metal is a group VIII noble metal.

19. The process of claim 18 wherein the Group VIII noble metal is platinum.

20. As a composition of matter, a catalyst composite for improving the utilization of catalytic metals which can be added thereto which comprises a particulate magnetic alloy of iron or cobalt containing a surface film formed by contact with a phosphate ion containing solution, and an inorganic oxide within which said particulate surface coated magnetic alloy is contained as inclusions dispersed within said inorganic oxide matrix.

21. The composition of claim 20 wherein the inorganic oxide matrix is alumina.

22. The composition claim 20 wherein the phosphate ion containing solution is phosphoric acid.

23. The composition of claim 20 wherein the inorganic oxide matrix is alumina and the phosphate ion containing solution is phosphoric acid.

24. The composition of claim 20 wherein the catalytic metal is a Group VIII metal.

25. The composition of claim 20 wherein the catalytic metal is a Group VIII noble metal.

26. The composition of claim 20 wherein the catalytic metal is platinum.